(12) United States Patent
Stangl

(10) Patent No.: US 11,565,549 B2
(45) Date of Patent: Jan. 31, 2023

(54) AXLE OF A VEHICLE

(71) Applicant: Bayerische Motoren Werke Aktiengesellschaft, Munich (DE)

(72) Inventor: Matthias Stangl, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/270,269

(22) PCT Filed: Aug. 19, 2019

(86) PCT No.: PCT/EP2019/072073
§ 371 (c)(1),
(2) Date: Feb. 22, 2021

(87) PCT Pub. No.: WO2020/038854
PCT Pub. Date: Feb. 27, 2020

(65) Prior Publication Data
US 2021/0316569 A1    Oct. 14, 2021

(30) Foreign Application Priority Data
Aug. 23, 2018  (DE) .................... 10 2018 214 287.4

(51) Int. Cl.
*B60B 35/00*  (2006.01)
*B62D 21/11*  (2006.01)

(52) U.S. Cl.
CPC ............ *B60B 35/007* (2013.01); *B62D 21/11* (2013.01)

(58) Field of Classification Search
None
See application file for complete search history.

(56) References Cited

U.S. PATENT DOCUMENTS

| 9,637,172 B2 | 5/2017 | Sagara et al. |
| 2007/0169982 A1 | 7/2007 | Ogawa et al. |

(Continued)

FOREIGN PATENT DOCUMENTS

| CN | 201544743 U | * | 8/2010 |
| CN | 102092258 A | * | 6/2011 |

(Continued)

OTHER PUBLICATIONS

International Search Report (PCT/ISA/210) issued in PCT Application No. PCT/EP2019/072073 dated Dec. 6, 2019 with English translation (six (6) pages).

(Continued)

*Primary Examiner* — Faye M Fleming
(74) *Attorney, Agent, or Firm* — Crowell & Moring LLP

(57) ABSTRACT

An axle of a vehicle includes an axle subframe, wherein the axle subframe has at least two longitudinal members oriented approximately in the vehicle longitudinal direction and at least one crossmember oriented at least approximately in the vehicle transverse direction. The axle subframe is attached to a body of the vehicle by at least one axle-subframe bearing, wherein the axle-subframe bearing is additionally supported on the body via a thrust arm. A drive unit is supported on the body and/or on the axle subframe via an assembly mounting. The drive unit is supported with the assembly mounting on the body of the vehicle via the thrust arm.

6 Claims, 1 Drawing Sheet

(56) References Cited

U.S. PATENT DOCUMENTS

| | | |
|---|---|---|
| 2009/0096253 A1 | 4/2009 | Yatsuda |
| 2018/0178844 A1 | 6/2018 | Takahashi |
| 2020/0353982 A1 | 11/2020 | Viereck et al. |
| 2021/0170822 A1* | 6/2021 | Stangl .................... B60G 7/02 |

FOREIGN PATENT DOCUMENTS

| | | |
|---|---|---|
| CN | 107298013 A | 10/2017 |
| DE | 40 10 378 C2 | 3/1992 |
| DE | 10 2014 102 541 A1 | 8/2015 |
| DE | 10 2014 219 292 A1 | 3/2016 |
| DE | 10 2016 106 272 A1 | 10/2017 |
| DE | 10 2017 216 658 A1 | 3/2019 |
| DE | 10 2017 220 096 A1 | 5/2019 |

OTHER PUBLICATIONS

German-language Written Opinion (PCT/ISA/237) issued in PCT Application No. PCT/EP2019/072073 dated Dec. 6, 2019 (six (6) pages).

German-language Search Report issued in German Application No. 10 2018 214 287.4 dated Jul. 23, 2019 with partial English translation (11 pages).

* cited by examiner

AXLE OF A VEHICLE

BACKGROUND AND SUMMARY OF THE INVENTION

The invention relates to an axle of a vehicle. With respect to the prior art, reference is made by way of example to DE 4010378 C2.

It is known for an axle carrier of a vehicle to be attached via what are known as axle carrier bearings to the body of the vehicle. Axle carrier bearings are used both in the region of the front axle and of the rear axle between the vehicle body and the chassis. Therefore, said bearings are connecting elements in the transition between an axle carrier and the vehicle body. Loads and vibrations which act on the axle carrier and occur during driving operation are to be largely decoupled from the vehicle body with the aid of bearings of this type, in order to increase the driving comfort and to minimize the production of noise within the vehicle. The elastic elements which are usually provided within the axle carrier bearings and are arranged between a region which is connected to the vehicle body and a region which is connected to the axle are configured in different hardnesses in a manner which is dependent on the respective requirements, in order to influence the driving comfort and the noise development in a manner which is dependent on the desired driving properties.

A bearing of this type is usually configured as a rubber bearing. Here, a rubber bearing of this type usually comprises a core which lies in the interior and a sleeve which encloses said core and surrounds the core with a rubber-like material.

The axle carrier can thus be connected to the body of the vehicle by means of a screw in the core of the rubber bearing.

In order to uniformly absorb axially acting forces on the rubber bearing, it is known, for example, from DE 4010378 C2 for an additional axial supporting face to be arranged at the free end of the bearing. Therefore, an axial travel limiting means of the rubber part of the bearing is achieved firstly by way of bearing against the vehicle body and secondly by way of a supporting face or a stop plate at the exposed bearing end.

Furthermore, it is known for the connection of the axle carrier to the vehicle body to be of double-shear configuration, in order that loading of the screw of the bearing by way of transverse torques does not occur. To this end, for example, the stop plate is extended to form a thrust rod and is attached once again to the body of the vehicle.

A motor/transmission unit is usually arranged on an axle carrier, depending on whether it is a front or rear axle of a vehicle. Said motor/transmission unit is likewise attached via what are known as unit bearings to the axle carrier or to the vehicle body. The motor/transmission unit of a motor vehicle is usually called a propulsion unit. Here, the propulsion unit is mounted on the vehicle body elastically, for example via motor bearings, transmission bearings and torque supports. The unit bearings absorb the static load of the motor/transmission unit, and limit the maximum travels in the case of load changes or high torques. An attempt is made here, for example, to effectively suppress the introduction of solid-borne sound as a result of the motor and transmission excitation into the vehicle body, in order to design vibrations, the vibration comfort and the interior noise level to be comfortable for occupants of the vehicle over the entire rotational speed range of the motor.

All of said bearing arrangements have to attached during the mounting of the axle via certain bearing blocks or the like to the body of the vehicle. This procedure costs time, effort and a large number of individual parts.

It is therefore an object of the invention to provide simple mounting for an axle (with a propulsion unit) of a vehicle.

The object is achieved by way of an axle with the features of the independent claim. Advantageous embodiments and developments are the contents of the dependent claims.

An axle of a vehicle is provided, which axle comprises an axle carrier, to which two wheel suspension systems (that is to say, a left-hand and a right-hand wheel suspension system as viewed in a plan view of the vehicle) are preferably fastened, and on which wheel control links are preferably supported or mounted in at least partially articulated manner.

Furthermore, an axle carrier of a motor vehicle is provided, which axle carrier comprises at least two longitudinal carriers which are oriented at least approximately in the vehicle longitudinal direction. Moreover, said axle carrier comprises at least one crossmember which connects the two longitudinal carriers. The crossmember with the longitudinal carriers together form at least approximately an H-shape, a U-shape or a rectangular shape, for example, in a plan view of the axle carrier.

Furthermore, it is provided that the axle carrier is supported by means of at least one axle carrier bearing on the body of the vehicle.

Here, the axle carrier is preferably supported on the body of the vehicle at least via two axle carrier bearings of this type, in particular at at least in each case one end of the longitudinal carriers.

Here, an axle carrier bearing of this type is preferably configured as a rubber bearing or hydraulic bearing. Here, a preferred rubber bearing comprises, in particular, a core which lies in the interior and a sleeve which encloses said core and surrounds the core with a rubber-like material.

Furthermore, it is preferably preferred that the bearing axis is oriented at least approximately in the vehicle vertical direction in the installed state of the axle carrier bearing.

Furthermore, it is provided that the axle carrier bearing is additionally supported via what is known as a thrust rod on the body of the vehicle. Here, a thrust rod of this type is arranged on the axle carrier bearing in such a way both that it is a stop in the axial direction of the bearing at the free end of the bearing, and what is known as a double-shear nature of the connection between the axle carrier and the vehicle body is established.

This is because the bearing bears as it were on its one end side against the vehicle body, whereas it is exposed on the other end side and does not have a stop. An axial stop is formed by way of the thrust rod which lies on said free end side of the bearing. As a result, the rubber element of the preferred rubber bearing can move only to a restricted extent in its axial movement relative to the core and the sleeve.

Here, the axle carrier bearing is preferably arranged in such a way that the axial direction or the direction of the longitudinal axis of the axial carrier bearing is oriented here at least approximately in the vehicle vertical direction.

By virtue of the fact that the thrust rod is additionally supported on the vehicle body, an abovementioned double-shear connection of the axle carrier to the vehicle body can be established via the bearing. Torque-induced loading of the core or a preferred screw of the axle carrier bearing can be reduced as a result. Accordingly, the thrust rod preferably comprises a seat, into which or through which the axle carrier bearing can be arranged. Here, the thrust rod is connected to the axle carrier bearing in such a way that it forms an axial stop at the one free end or the free end side or that side of the bearing which faces away from the vehicle body.

Furthermore, it is provided that a drive unit is supported via a unit bearing on the body of the vehicle. Here, the drive unit is supported on the axle carrier, in particular on a rear axle carrier, or is arranged or suspended thereon. A drive unit of this type is, in particular, an electric motor drive unit. As an alternative, however, a conventional internal combustion engine drive unit or an axle drive or an internal combustion engine is also conceivable.

Furthermore, it is provided that the drive unit is supported by way of the unit bearing via the thrust rod on the body of the vehicle. To this end, the thrust rod preferably comprises a further seat, in which the unit bearing can be arranged. The unit bearing is preferably pressed into said seat of the thrust rod.

Here, the axial direction of the longitudinal axis of the unit bearing is further preferably oriented at least approximately in the vehicle transverse direction in the installed state in the seat.

Here, in addition to the abovementioned double-shear nature and the stop of the axle carrier bearing, a thrust rod of this type therefore additionally forms a fastening or a bearing point of the propulsion unit. Additional bearing blocks for the attachment of the drive unit to the vehicle body can be advantageously dispensed with in this way. Furthermore, as a result, an additional mounting step is advantageously dispensed with, with the result that the propulsion unit can be mounted together with the axle carrier on the vehicle body.

Furthermore, it is preferably provided that the abovementioned thrust rod is connected in a non-positive manner to the body of the vehicle. Here, in particular, a screw connection comes into question.

Here, the axle carrier bearing is further preferably connected by way of a screw connection (which leads through the core of the bearing) via the thrust rod to the body of the vehicle.

Apart from the claims and from the description, said features and further features are also apparent from the drawings, it being possible for the individual features to be implemented in each case per se on their own or in multiples in the form of sub-combinations in the case of one embodiment of the invention, and to represent advantageous embodiments which are patentable per se and for which protection is claimed herein.

DETAILED DESCRIPTION OF THE DRAWINGS

In the following text, the invention will be described further on the basis of one exemplary embodiment. Here, all of the features which are described in greater detail can be essential to the invention.

Figure 1:
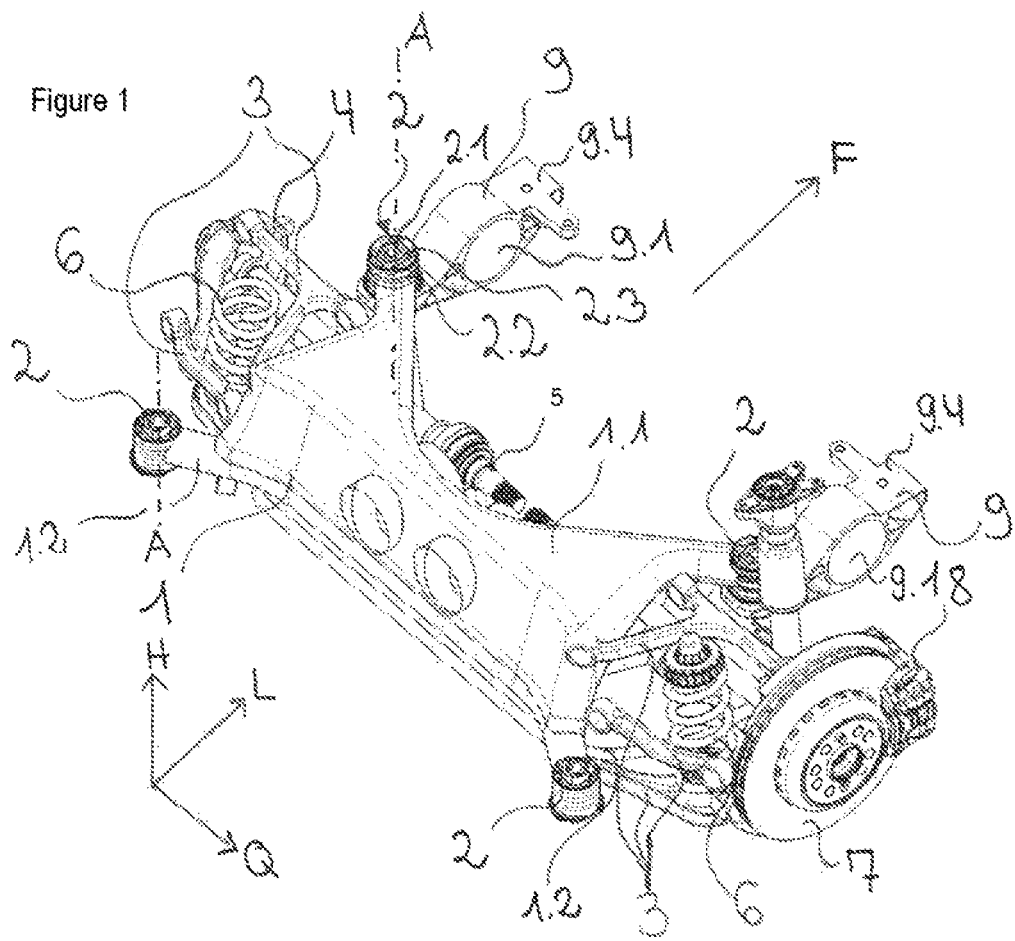
FIG. 1 illustrates a part of a rear axle of a double-track vehicle.

A part of a rear axle of a double track vehicle can be seen diagrammatically in FIG. 1. Here, in particular, an at least approximately H-shaped rear axle carrier 1 can be seen which is supported or mounted via four axle carrier bearings 2 on a body (not shown) of the vehicle. Furthermore, the axle comprises a wheel suspension system with a plurality of wheel control links 3 which are attached to the axle carrier 1 (the attachment of the links being shown merely diagrammatically), and with in each case one wheel carrier 4 and one spring arrangement 6. Moreover, a brake disk 7 and a brake caliper 8 of a wheel are indicated diagrammatically on one side of the rear axle. Here, the axle carrier comprises a crossmember 1.1 which is oriented at least approximately in the vehicle transverse direction Q, and two longitudinal carriers 1.2 which are oriented at least approximately in the vehicle longitudinal direction L.

Furthermore, an electric motor drive unit (not shown) is suspended on the rear axle carrier 1, which drive unit can drive the rear wheels (not shown) of the vehicle via a drive shaft 5.

Here, the axle carrier bearings 2 are configured as what are known as rubber bearings; the latter have a metallic core 2.1 which is surrounded by a sleeve 2.2. Here, a rubber element 2.3 for elastic mounting is arranged between the metallic core 2.1 and the sleeve 2.2. For a suitable screw connection through the core 2.1, the bearings 2 can be connected to the body of the vehicle (in the vehicle vertical direction H).

Here, the electric motor drive unit is likewise supported via what are known as unit bearings (not shown) on the vehicle body.

It is provided here that both the front (as viewed in the vehicle driving direction F in the case of forward or reverse driving of the vehicle) two axle carrier bearings 2 and two unit bearings (not shown) are supported via a thrust rod 9 on the vehicle body.

Figure 2:
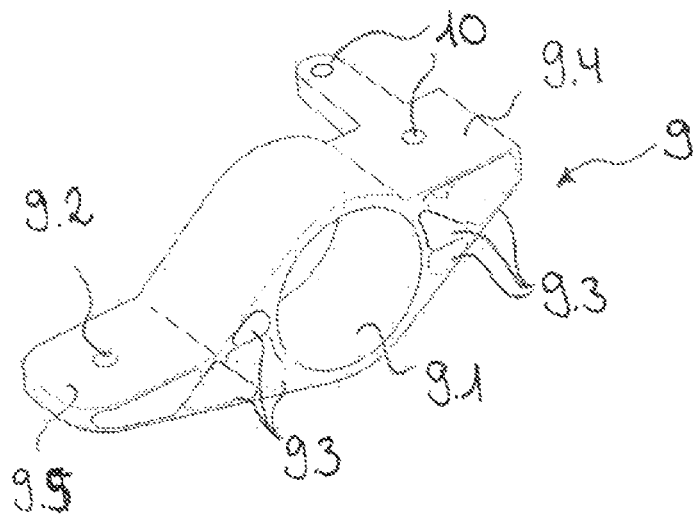
FIG. 2 is a perspective view of the right-hand thrust rod shown in FIG. 1.

To this end, as indicated in FIG. 2 in a three-dimensional view of the right-hand (as viewed in the vehicle driving direction F) thrust rod, the thrust rod 9 comprises two seats 9.1, 9.2, a first seat 9.1 for receiving the unit bearing (not shown), and a second seat 9.2 for receiving or attaching the axle carrier bearing 2.

Here, the thrust rod 9 itself is preferably connected via a screw connection 10 to the vehicle body.

As can be seen in FIG. 2, the thrust rod 9 is configured as a comparatively solid component which has ribbing systems 9.3 in order to meet the rigidity requirements and nevertheless a low weight. On a first planar face 9.4 of the thrust rod, the latter bears flatly against the body of the vehicle, whereas, on a further planar face 9.5, said thrust rod bears flatly against the lower (in the vehicle vertical direction H) end side of the axle carrier bearing 2.

As can be seen in FIG. 1, it is provided here, in particular, that the thrust rod 9 is arranged at the "free" end or the end side of the axle carrier bearing 2, which end side faces away from the vehicle body; that is to say, that end side of the axle carrier bearing 2 of at least approximately cylindrical configuration which is oriented along the vertical axis H of the vehicle in the direction of the road in the installed state in the vehicle. By way of an arrangement of this type of the thrust rod 9, the latter forms an axial travel limiting means of the rubber element 2.3 of the axle carrier bearing 2. In other words, the attachment or arrangement of the thrust rod on that end side of the bearing 2 which faces away from the vehicle body forms a stop in the vehicle vertical direction H (which is at least approximately the axial direction A of the bearing). It can therefore advantageously be prevented that, on account of high loads, the rubber element 2.3 moves to a pronounced extent with respect to the core 2.1 or the sleeve 2.2 in the axial direction of the bearing or in the vehicle vertical direction. A stop plate which is usually used can be replaced by the thrust rod 9.

By virtue of the fact that the thrust rod 9 is supported on the body of the vehicle (for example, by way of the abovementioned screw connection 10), a double-shear nature of the "axle carrier/vehicle body" connection is established via the axle carrier bearing 2. This means great relieving of the screw connection of the axle carrier bearing 2 to the vehicle body, and of the core 2.1 of the axle carrier bearing 2, in particular in the case of lateral force actions (that is to say, transversely with respect to the axial direction at least approximately in the vehicle transverse direction Q) on the bearing 2.

As can be seen in FIG. 1, it is accordingly provided that the axle carrier bearing 2 is installed in such a way that its longitudinal axis is oriented at least approximately in the vehicle vertical direction H.

Furthermore, the embodiment according to the invention affords the advantage that a bearing block is no longer required at this location for the attachment of the (in this case, electric motor) drive unit, and the drive unit can be attached by way of the thrust rod 9 to the body of the vehicle.

LIST OF DESIGNATIONS

1 Rear axle carrier (sub frame)
1.1 Crossmember
1.2 Longitudinal carrier (mount)
2 Axle carrier bearing
3 Link
4 Wheel support
6 Spring
7 Brake disk
8 Brake caliper
9 Thrust rod
9.1 Seat
9.2 Seat
9.3 Ribbing system
9.4 Planar face
9.5 Planar face
F Vehicle driving direction
L Vehicle longitudinal direction
H Vehicle vertical direction
Q Vehicle transverse direction
A Axial axis of the bearing

The invention claimed is:

1. An axle of a vehicle, comprising:
an axle carrier, wherein the axle carrier comprises at least two longitudinal carriers oriented approximately in a vehicle longitudinal direction, and at least one cross-member oriented at least approximately in a vehicle transverse direction;
at least one axle carrier bearing that attaches the axle carrier to a body of the vehicle;
a thrust rod that additionally supports the axle carrier bearing on the vehicle body; and
a unit bearing on the body of the vehicle and/or on the axle carrier configured to support a drive unit of the vehicle, wherein the unit bearing is configured to support the drive unit via the thrust rod on the body of the vehicle.

2. The axle according to claim 1, wherein the thrust rod comprises a seat for the axle carrier bearing.

3. The axle according to claim 2, wherein the thrust rod comprises a further seat for the unit bearing.

4. The axle according to claim 1, wherein the thrust rod is connected in a non-positive manner to the body of the vehicle.

5. The axle according to claim 1, wherein the drive unit is an electric motor.

6. The axle according to claim 1, wherein,
a longitudinal axis of the axle carrier bearing, when installed, is oriented at least approximately in a vehicle vertical direction, and
a longitudinal axis of the unit bearing, when installed, is oriented at least approximately in the vehicle transverse direction.

* * * * *